(12) United States Patent
Fleener

(10) Patent No.: US 6,256,970 B1
(45) Date of Patent: Jul. 10, 2001

(54) LAWN MAINTENANCE APPARATUS WITH MULTI-ATTACHMENT, MULTI-ADJUSTABLE

(75) Inventor: Clyde J. Fleener, Centerview, MO (US)

(73) Assignee: Swisher Mower & Machine Co., Inc., Warrensburg, MO (US)

(*) Notice: Subject to any disclaimer, the term of this patent is extended or adjusted under 35 U.S.C. 154(b) by 0 days.

(21) Appl. No.: 09/360,853

(22) Filed: Jul. 24, 1999

Related U.S. Application Data
(60) Provisional application No. 60/094,020, filed on Jul. 24, 1998.

(51) Int. Cl.⁷ .................................................. A01D 34/00
(52) U.S. Cl. ............................................. 56/12.7; 56/12.1
(58) Field of Search ...................... 56/12.7, 12.1, 56/17.1, 17.2, 13.6, 13.7, DIG. 18; 30/27, 6; 172/13, DIG. 8

(56) References Cited

U.S. PATENT DOCUMENTS

| | | | |
|---|---|---|---|
| 3,668,845 | * 6/1972 | Parker | ..................................... 56/11.6 |
| 3,977,475 | 8/1976 | Zugai . | |
| 4,787,195 | * 11/1988 | Wenzel | ..................................... 56/11.1 |
| 4,936,886 | 6/1990 | Quillen . | |
| 5,167,108 | * 12/1992 | Bird | ..................................... 56/13.7 |
| 5,199,502 | 4/1993 | Hirata et al. . | |
| 5,246,403 | 9/1993 | Uphaus . | |
| 5,577,374 | 11/1996 | Huston . | |
| 5,862,655 | * 1/1999 | Altamirano et al. | .................. 56/12.1 |

* cited by examiner

Primary Examiner—Thomas B. Will
Assistant Examiner—Árpád Fábián Kovács
(74) Attorney, Agent, or Firm—Shughart Thomson & Kilroy P.C.

(57) ABSTRACT

A mobile lawn maintenance apparatus includes an implement mounting assembly for mounting an implement relative to the apparatus base which permits rotation of the implement about a horizontal axis and pivoting the implement about a vertical axis. An implement drive shaft, to which various implements may be interchangeably secured, is rotatably mounted in a bearing assembly which is secured to a distal end of the implement mounting assembly. The implement drive shaft is driven by a drive belt connected between an implement drive pulley on the implement drive shaft and a drive pulley mounted on a drive shaft of an engine mounted on the frame of the apparatus. The implement mounting assembly telescopes and is spring biased to urge to implement drive pulley away from the engine drive pulley to maintain constant tension on the drive belt during rotation of the implement attached to the implement mounting assembly.

19 Claims, 6 Drawing Sheets

LAWN MAINTENANCE APPARATUS WITH MULTI-ATTACHMENT, MULTI-ADJUSTABLE

CROSS-REFERENCE TO RELATED APPLICATION

This is a continuation in part of provisional patent application Ser. No. 60/094,020, titled Walk Behind String Weed Trimmer with Adjustable Head for Bevel Cutting or Edging, filed Jul. 24, 1998.

BACKGROUND OF THE INVENTION

1. Field of the Invention

This invention is directed to lawn maintenance apparatus, and more particularly, to apparatus with an implement attached thereto such as a string weed trimmer with a string trimmer head which can be rotated from a horizontal trimming position to a vertical edging position, and can further be selectively positioned laterally to increase the trimmer's versatility and ease of maneuvering. The present invention is also directed to such apparatus with interchangeable implements.

2. Description of the Related Art

String trimmers and the like have traditionally taken the form of hand-held units with a small engine mounted at one end of an elongate tubular housing with the engine driving a drive shaft. The drive shaft typically connects through the tubing to a rotating string trimmer head at the opposite end thereof. These trimmers have a number of disadvantages, including discomfort associated with carrying fairly heavy engines and housings, the physical effort it takes to swing the trimmers back and forth during trimming, the corresponding restriction on engine size and power required to maintain portability of the trimmers, and other disadvantages.

Attempts have been made to mount string trimmers and powers sources to wheeled carriages. For example, U.S. Pat. No. 4,936,886 to R. D. Quillen teaches a string trimmer which resembles a typical hand held unit, but is carried on a horizontal frame supported by a pair of wheels. The trimmer drive shaft can be rotated relative the frame to adjust the trimmer head angle.

U.S. Pat. No. 5,577,374 to T. G. Huston discusses another such trimmer. The Huston patent teaches a string trimmer head which is mounted forward of a wheeled carriage on a fixed frame extension. The wheeled carriage mounts an engine which drives a drive pulley. A flexible belt is connected between the engine drive pulley and trimmer head to provide rotary power to the head. The head itself is attached to an elongate shaft which can be rotated thereby adjusting the head angle.

A need still exists for a wheel-mounted string trimmer with a trimmer head which can be readily angularly adjusted about a first generally horizontal axis, and selectively positioned laterally about a second generally vertical axis for maximum maneuverability and versatility. In addition there remains a need for such an apparatus which could be adapted for interchangeable replacement of a string trimmer head with other rotatable implements such as edgers, blowers and the like.

SUMMARY OF THE INVENTION

The present invention comprises a mobile apparatus incorporating an implement drive shaft mounted in a bearing assembly which is telescopically mounted relative to a support frame by a telescoping implement mounting assembly. One or more rotatable implements, attachments or heads, such as a string trimmer head, blade edger, blower or the like, are removably securable to the implement drive shaft. The implement drive shaft is rotatably driven by an engine mounted to the support frame and connected to the implement drive shaft by a drive assembly such as a system of belts and pulleys.

The telescoping implement mounting assembly includes a base member mounted to the base frame and a telescoping member slidingly or telescopingly secured to the base member. The telescoping member is rotatably mounted relative to said base member about a horizontal axis and the base member is pivotally mounted to said base frame to pivot about a vertical axis such that an implement secured to the drive shaft may be rotated about a horizontal axis or pivoted from side to side.

In a preferred embodiment, the drive assembly comprises an engine drive shaft extending vertically below the engine with a drive pulley mounted on the end of the drive shaft. A second pulley is mounted on the implement drive shaft on a side of the bearing assembly opposite the implement. The drive pulley is connected to the second pulley by a belt. The drive pulley and the second pulley generally extend in the same plane when the implement drive shaft is vertically oriented. When the implement drive shaft is rotated out of vertical alignment by rotation of the telescoping member the pulleys are advanced out of planar alignment increasing the effective path of travel of the drive belt.

A spring is mounted to the telescoping implement mounting assembly and acts on the telescoping member to biasingly urge it away from the base member so as to urge the bearing assembly and implement drive shaft away from the base member. Biasing of the bearing assembly and implement drive shaft away from the base member provides for constant tension on the drive belt. For example, as the bearing assembly and implement drive shaft are rotated from an approximately horizontal alignment to a vertical alignment, the circumference of the drive belt necessary to maintain constant tension would be reduced if the mounting assembly were of fixed length. In the apparatus of the present invention, as the telescoping member is rotated to rotate the bearing assembly and the implement drive member to a vertical alignment, the spring biases the telescoping member outward thereby increasing the distance between the drive pulley and the second pulley to take up any slack in the drive belt and maintain constant tension thereon. When the telescoping member is rotated to rotate the bearing assembly and the implement drive member out of vertical alignment, the increased tension on the drive belt causes the telescoping member to retract relative to the base member against the biasing force of the spring, thereby maintain proper tension on the drive belt.

OBJECTS AND ADVANTAGES OF THE INVENTION

The objects and advantages of the present invention include: providing a walk-behind lawn apparatus with a multi-adjustable head; providing such an apparatus with an implement head which is remotely adjustable; providing such an apparatus which is versatile and easily maneuverable; providing such an apparatus with an implement head which can be selectively positioned laterally; providing such an apparatus with an implement head that can be angularly rotated; providing such an apparatus in which a variety of implements are removably and interchangeably securable thereto and providing such an apparatus which is particularly well-suited to its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE PREFERRED EMBODIMENT

I. Introduction and Environment

Figure 1:
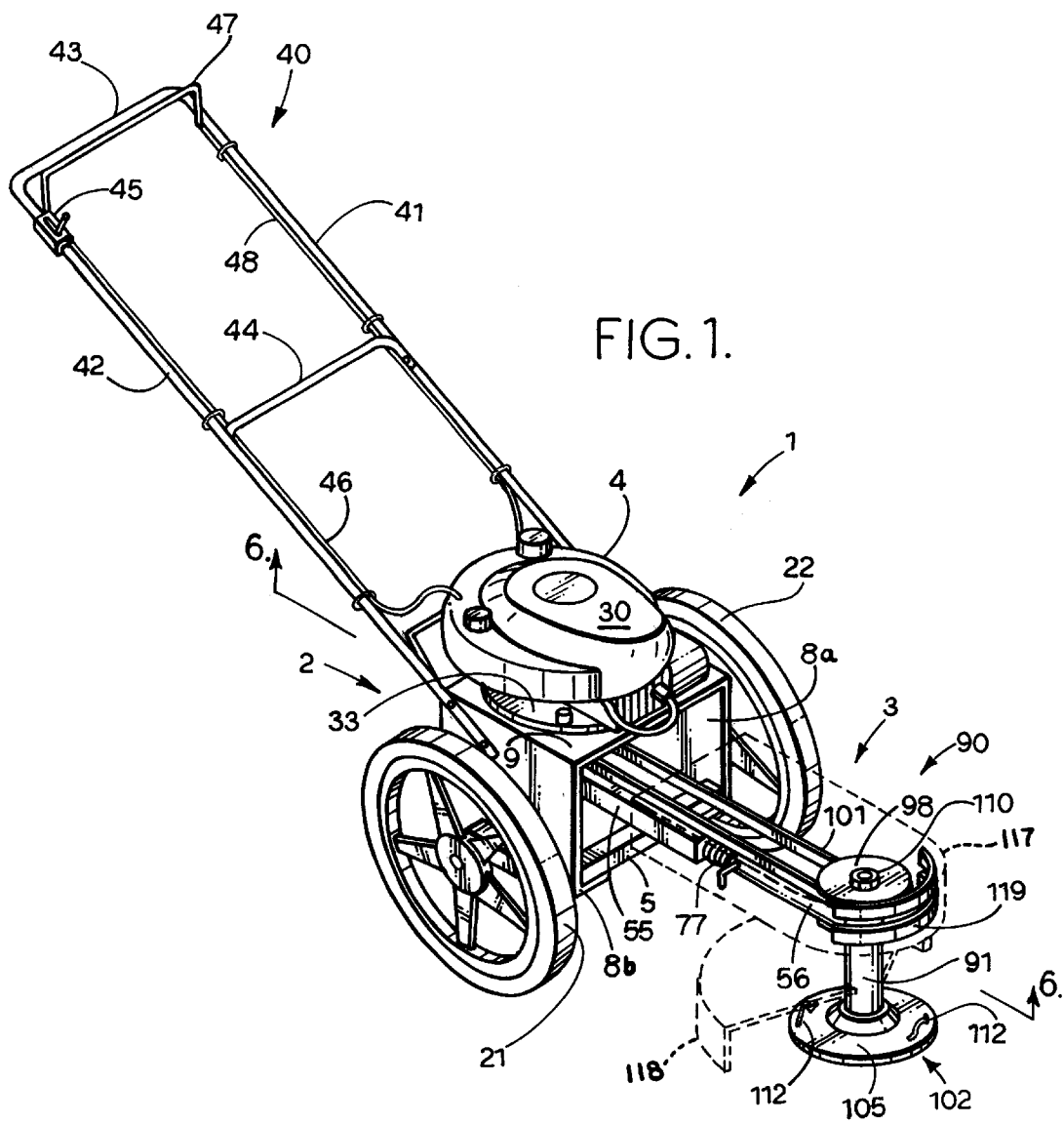
FIG. 1 is a perspective view of a lawn maintenance apparatus configured as a weed trimmer with a weed trimmer head positioned for horizontal cutting.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawing FIGS. 1–4, the reference numeral 1 refers a walk-behind, powered, lawn maintenance apparatus configured as a string weed trimmer. The trimmer 1 generally comprises a support frame or housing 2, an adjustable implement mounting assembly 3, and a power source 4.

II. Frame

Figure 6:
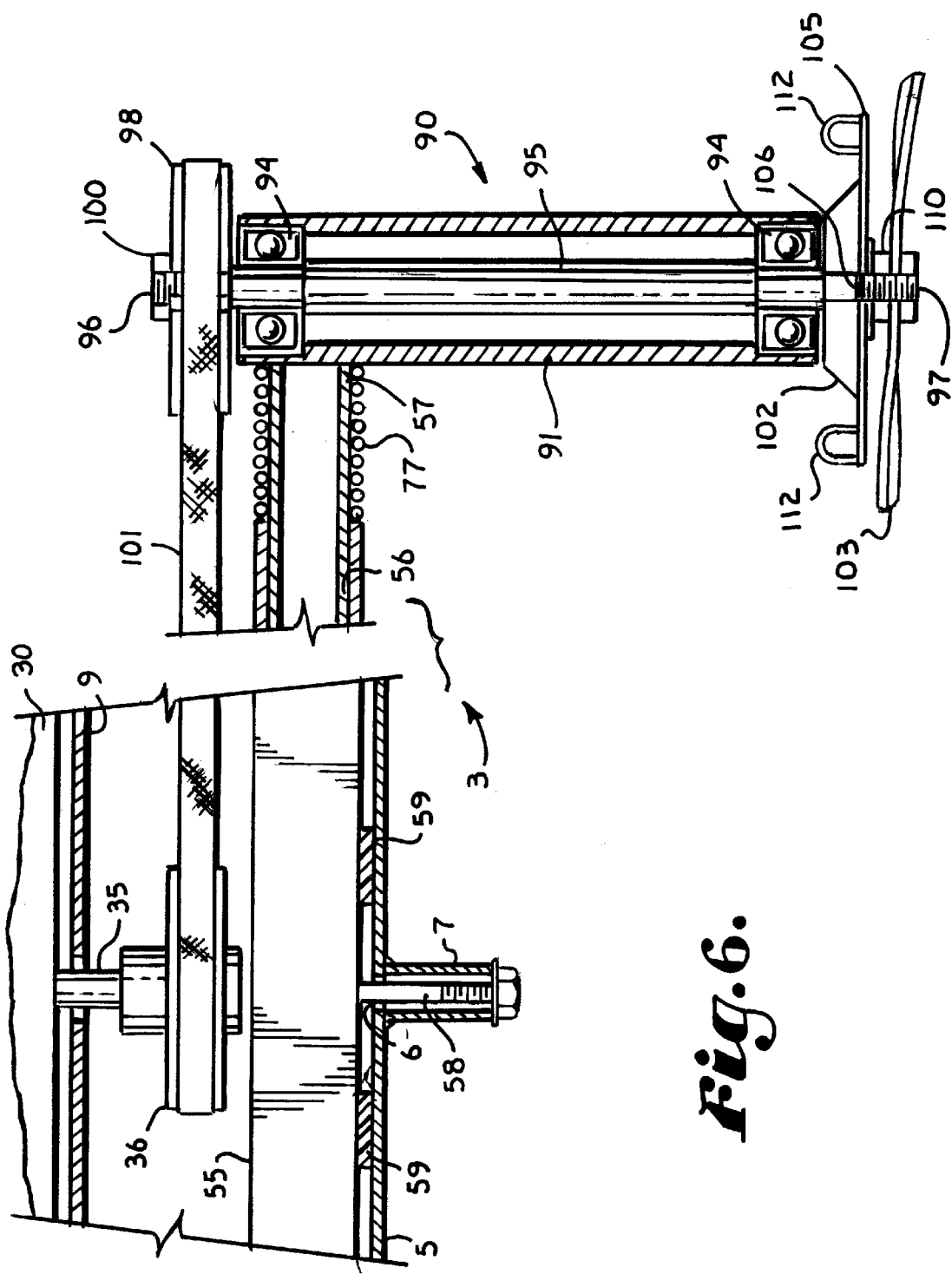
FIG. 6 is an enlarged and fragmentary cross-sectional view of an alternative embodiment of the lawn maintenance apparatus taken along a line which would generally correspond with line 6—6 of FIG. 1.

The frame 2 includes a bottom frame member 5. As shown in FIG. 6, an opening 6 extends through a central portion of the bottom frame member 5 and a cylindrical sleeve 7 extends below the opening 6 in alignment therewith and is welded to the bottom frame member 5. The purpose of the sleeve 7 will be discussed more below.

The frame 2 also includes opposed side walls 8a and 8b, top panel 9, and rear panel 10. The front of the frame or housing 2 is generally open.

Figure 5:
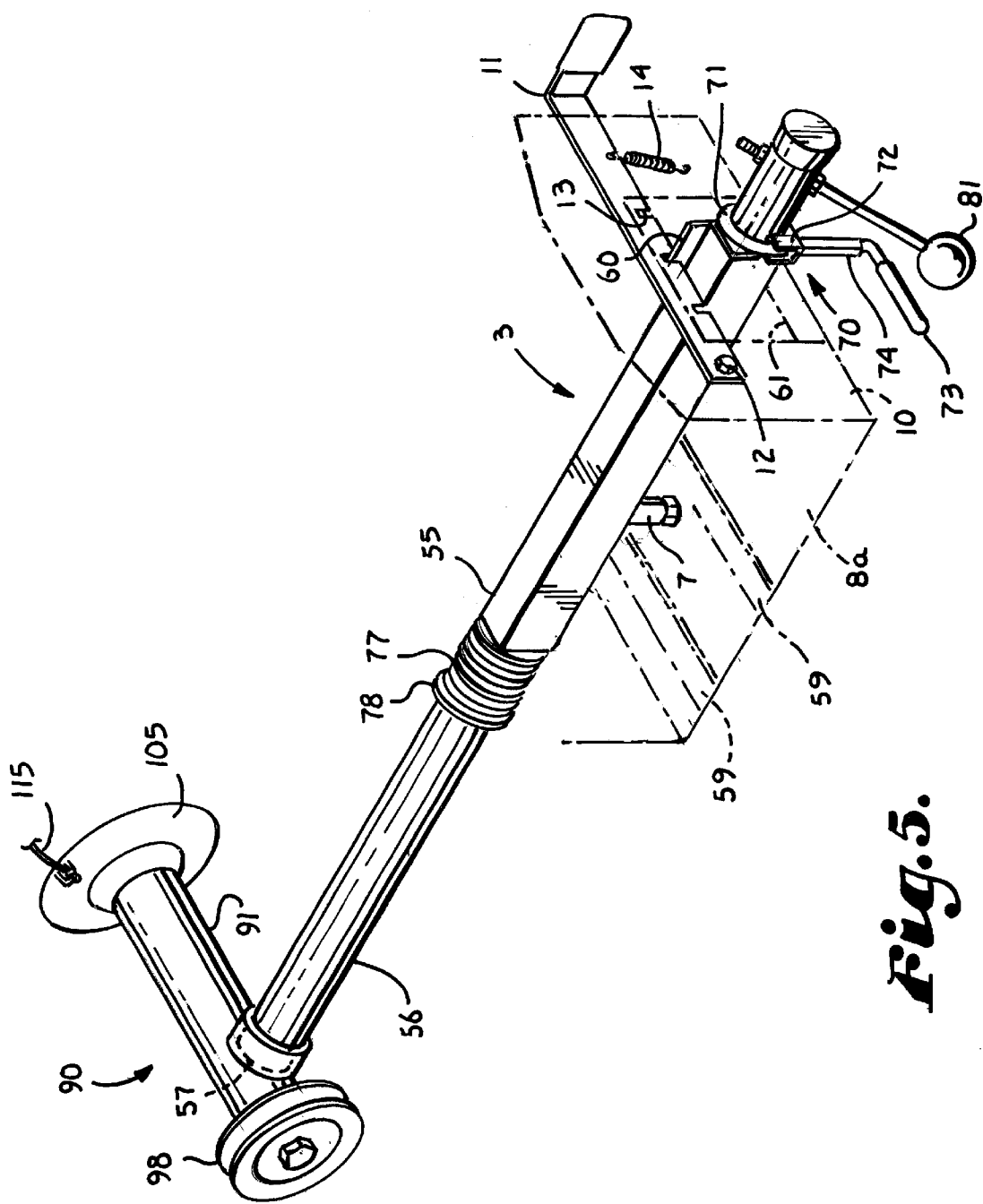
FIG. 5 is an enlarged and fragmentary perspective view of the lawn maintenance apparatus showing an implement mounting assembly and showing the weed trimmer head rotated for vertical cutting.

Referring to FIG. 5, a latch 11 is pivotally connected to the rear panel 10 by means such as a pivot pin or bolt 12 such that the latch 11 can rotate about the bolt 12. The latch 11 includes a plurality of notches 13 formed in a lower edge thereof in spaced apart relation. A latch spring 14 is attached at one end to the latch 11 and at an opposite end to the rear panel 10 below the latch 11 to pull the latch 11 downward.

A pair of high-profile wheels 21, 22 are rotatably connected to the support frame 2 on opposite sides thereof and support the frame 2 above the ground.

The power source 4 is shown as an internal combustion engine 30. The engine 30 is secured to the frame 2 by any suitable means. For example, the engine 30 may be secured by bolting an engine outer flange portion 33 thereof to the top panel 9. Referring to FIG. 6, a vertically-oriented drive shaft 35 extends downward from the engine 30 into the housing 2. A horizontally-oriented drive pulley 36 is secured to the lower end of the drive shaft 35.

A conventional handle 40 with side members 41 and 42 is attached (e.g. bolted) to respective rear potions of the housing sidewalls 8a and 8b and extends backward and upward at an angle to a comfortable gripping height for a user. The handle 40 also includes upper and lower cross members 43,44. A throttle control device 45 is mounted on the side member 41 and is attached by a cable 46 to the engine 30. A safety or kill switch 47 is mounted by any suitable means to the handle 40 and is connected to the engine 30 by a cable 48. The kill switch 47 must be engaged, for example by grasping and positioning it immediately adjacent to the handle's upper cross member 43, for the engine 30 to operate.

III. Implement Mounting Assembly

Referring to FIG. 5, the telescoping implement mounting assembly 3 is attached to the frame 2 beneath the drive pulley 36. The implement mounting assembly 3 includes a base member or pivot arm 55 and a telescoping member or mounting shaft 56 with a distal end 57 extending forward from the base member 55. The base member 55 is shown as being formed from a square tube and the telescoping member 56 is shown as being formed from a cylindrical tube slidingly and rotatable secured within the base member 55.

Referring to FIG. 6, a pivot pin 58 is secured to and extends vertically downward from the bottom of the base member 55. The pivot pin 58 is rotatably secured within the sleeve 7 and the base member 55 is supported on front and rear support pads 59 secured to the bottom frame member 5 such that the base member 55 is pivotal from side to side about a vertical axis extending through the pivot pin 58. Referring to FIG. 5, a vertically extending flange 60 is welded to the base member 55 at a rear end and along an upper edge of the base member 55. The rear end of the base member 55 extends through an opening 61 in the rear panel 10 of housing 2 to permit the rear end of base member 55 to pivot relative thereto. The flange 60 is located on the base member 55 to be selectively received in one of the notches 13 of latch 11 to fix the side to side pivotal orientation of the base member 55 and the implement mounting assembly 3.

The telescoping member 56 extends through the base member 55 from front to back thereof with a substantial portion of the telescoping member 56 extending forward past the front of the base member 55 and a portion of the telescoping member 56 extending rearward beyond the rear end of the base member 55.

Referring to FIG. 5, a clamp assembly 70 connected to the base member 55 and engaging the telescoping member 56 is adapted to fix the position of the telescoping member 56 relative to the base member 55 once the desired orientation is achieved. The clamp assembly 70 generally comprises a U-shaped bolt or U-bolt 71 with threaded ends and a yoke 72. The yoke 72 is welded to the base member 55 at a rear end thereof behind the rear panel 10 of housing 2. The U-bolt 71 is positioned on top of the telescoping member 56 with its threaded ends extending through aligned holes in the yoke 72. A handle 73 with a threaded receiver 74 thereon is threaded onto one of the threaded ends of the U-bolt 71 and a lock nut (not shown) is threaded onto the other threaded end of the U-bolt 71. Tightening down of the handle 73 compresses or clamps the telescoping member 56 between the U-bolt 71 and the yoke 72 to prevent the telescoping member 56 from sliding or rotating relative to the base member 55. Conversely, loosening of the handle 73 releases the compressive forces against the telescoping member 56 and permits sliding and rotation of the telescoping member 56 relative to the base member 55. It is foreseen that a wide variety of means could be utilized to selectively prevent rotation and sliding of the telescoping member 56 relative to the base member 55.

The distal end 57 of the telescoping member 56 is biased away from or forward relative to the base member 55 by a coil spring or helical spring 77 acting on the base member 55 and telescoping member 56. The spring 77 may be mounted on the telescoping member 56 such that one end of the spring 77 abuts against and engages a front end of the base member 55 and an opposite end of the spring 77 abuts against a radial flange 78 welded to the telescoping member 56.

A handle 81 is bolted to the rear end of the telescoping member 56 to permit an operator to manually rotate or slide the telescoping member 56 relative to the base member 55, and to pivot the base member 55 relative to the support frame 2 about the pin 58. The base member 55 therefore serves as a pivot arm wherein lateral movement of the proximate end of the base member 55 through the handle 81 causes the base member 55 to pivot about the vertical axis provided by the pivot pin 58, inducing lateral movement of the distal end 57 of the telescoping member 56 in the opposite direction.

A bearing assembly 90 is attached to the distal end 57 of the telescoping member 56. The bearing assembly 90 includes a cylindrical tube 91 which is welded to the distal end 57 of the telescoping member and generally extends downward therefrom. Details of the bearing assembly are shown in FIG. 6. It is noted that the implement mounting assembly 3 as shown in FIG. 6 is of a slightly modified version than as shown in the previous Figures in that the base member 55 extends farther forward from the frame 2 and the front end of the spring 77 abuts against the cylindrical tube 91 of the bearing assembly 90 as opposed to against a radial flange 78 on the telescoping member 56 which has been removed.

As shown in FIG. 6, a pair of bearings 94 are secured in the cylindrical tube 91 at opposite ends thereof. An implement drive shaft 95 is rotatably mounted through the bearings 94. An upper threaded end 96 of the implement drive shaft 95 extends upward through the upper end of the cylindrical tube 91, and a lower threaded end 97 extends downward from the lower end of the cylindrical tube 91. A second pulley 98 is threaded onto the upper threaded end 96 of the implement drive shaft 95 and secured thereon by a nut 100. A drive belt 101 is connected to and extends between the drive pulley 36 and the second pulley 98 for rotatably driving the implement drive shaft 95.

A variety of implements or attachments may be attached to the lower threaded end 97 of the implement drive shaft 95.

In FIGS. 1–5 a string trimmer attachment 102 is shown attached to the implement drive shaft 95. In FIG. 6, an edging blade 103 is shown attached to the implement drive shaft 95.

The string trimmer attachment or implement 102 comprises a disc-shaped plate 105 with an opening 106 in the center thereof which is removably securable on the lower threaded end 97 of the implement drive shaft. A nut 110 is attached (e.g. welded) to a lower surface of the plate 105 in encircling relationship with the opening 106 for securing the plate 105 to the lower threaded end 97 of the implement drive shaft 95. A lower plastic support 111 with a threaded bore extending therethrough is attached to a portion of the lower threaded end 97 of the implement drive shaft 95 extending beyond the nut 110 and provides support and protection when contacting the ground surface. A recess (not shown) is formed in an upper surface of the plastic support 111 to receive nut 110.

A pair of bails or loops 112 are attached (e.g. welded) to opposite outer portions of the upper surface of the plate 105. A length of plastic string 115 for cutting grass, weeds, and the like is tied to the loops 112.

Referring to FIG. 6, the plastic support 111 has been removed and the edging blade 103 is shown attached to the lower threaded end 97 of the implement drive shaft 95 in its place. Although the plate 105 is not shown as being removed it is foreseen that it could be removed before attachment of the edging blade 103 or other implements.

Figure 3:
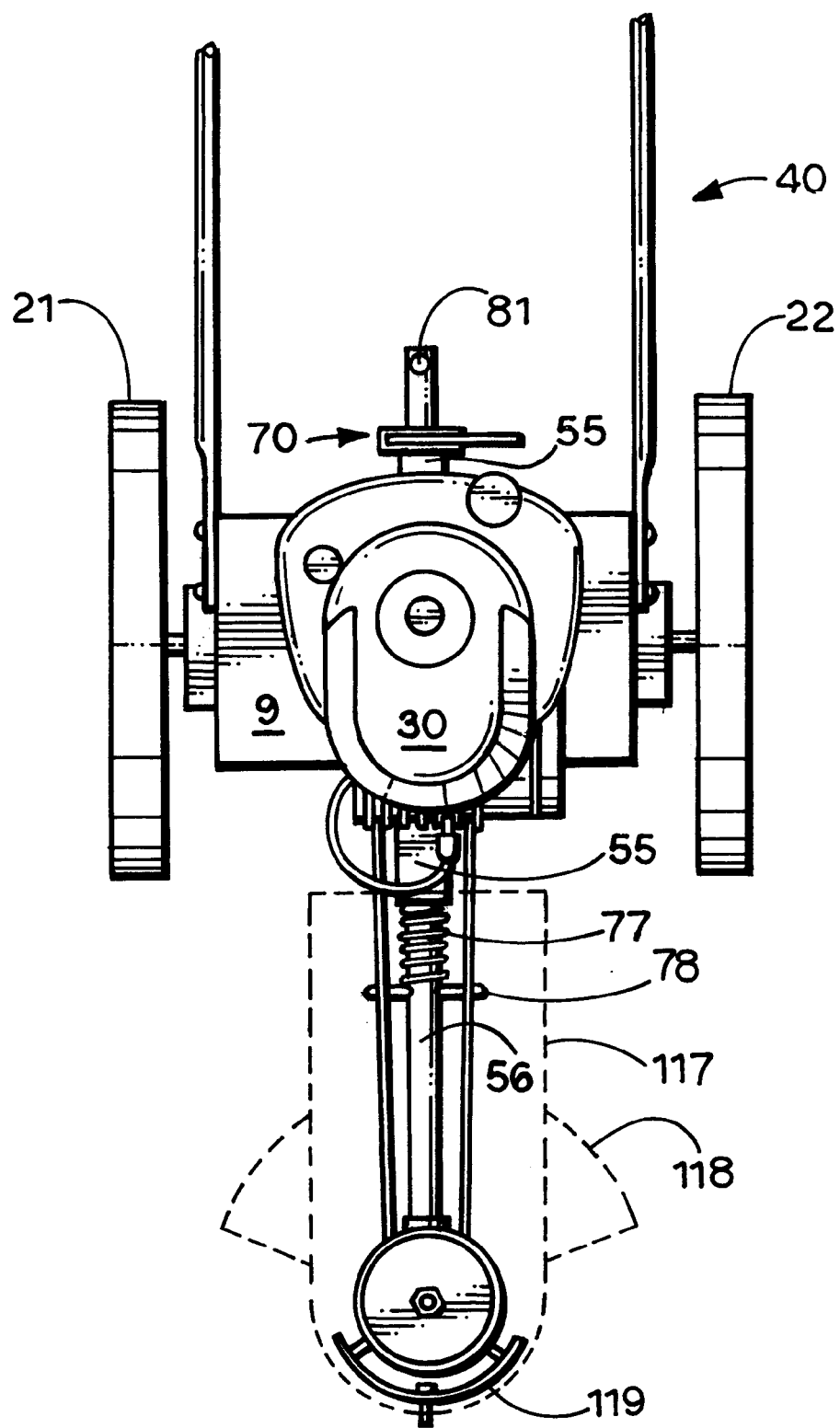
FIG. 3 is a fragmentary top perspective view of the apparatus of FIG. 1.

A plurality of plastic safety guards including safety guards 117 and 118 (shown in phantom lines in FIGS. 1 and 3, are attached to the apparatus. Safety guard 117, which is mounted to a mounting structure 119 on the cylindrical tube 91 of the bearing assembly 90, covers the drive belt 101. Safety guard 118 is also mounted to the cylindrical tube 91 of the bearing assembly 90 deflects debris thrown up through rotation of the implement 1 during use.

It is foreseen that a blower attachment (not shown) with a rotatable fan blade could also be attached to the implement drive shaft 95 for use in blowing leaves and debris. It is foreseen that in certain applications, such as with a blower attachment, the telescoping member 56 along with the bearing assembly 90, second pulley 98, and implement drive shaft 95 could be replaced with an assembly with similar components but different sizes and proportions to accommodate various implements.

IV. Operation

Figure 2:
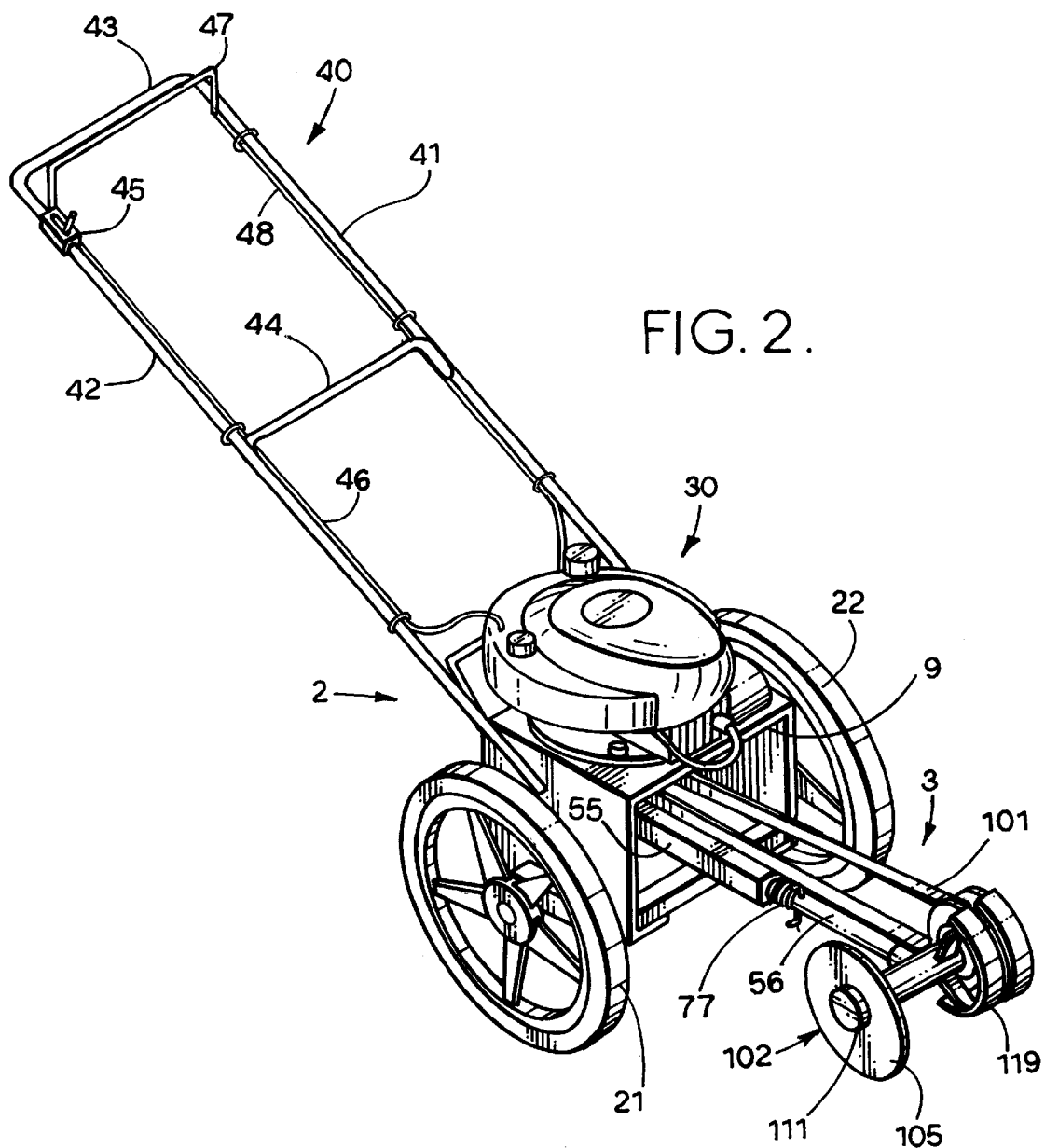
FIG. 2 is a perspective view similar to FIG. 1, showing the weed trimmer head rotated for vertical cutting.

The drive belt 101 is attached to the drive pulley 36 and then to the second pulley 98 by drawing or pushing the telescoping member 56 rearward relative to the base member 55 against the biasing force of the spring 77, positioning the belt 101 around second pulley 98 and then releasing the telescoping member 56 such that the spring 77 forces the distal end 57 of the telescoping member forward and away from the base member 55 until the belt 101 is pulled taught. The string trimmer attachment 102 (or other attachment) can be rotated angularly from a generally horizontal position, as shown in FIG. 1, for cutting weeds and the like about a horizontal plane, to a generally vertical edging position, as shown in FIG. 2, for cutting weeds and the like about a vertical plane such as in an edging application, or any position therebetween. As noted, handle 81 is used to rotate the telescoping member 56 and the rotational orientation of the telescoping member 56 relative to the base member 55 may be fixed or set using the clamp assembly 70.

The tension on the belt 101 is self-adjusting during rotation of the telescoping member 56 to adjust the radial orientation of the implement. For example, when the telescoping member 56 is rotated to rotate the bearing assembly 90 and the implement drive shaft 95 out of vertical alignment, the increased tension on the drive belt 101 causes the telescoping member 56 to retract relative to the base member 55 against the biasing force of the spring 77, thereby maintaining proper tension on the drive belt 101. Conversely, as the telescoping member 56 is rotated to rotate the bearing assembly 90 and the implement drive shaft 95 to a vertical alignment, the spring 77 biases the telescoping member 56 outward thereby increasing the distance between the drive pulley 36 and the second pulley 98 to take up any slack in the drive belt 101 and maintain constant tension thereon.

Figure 4:
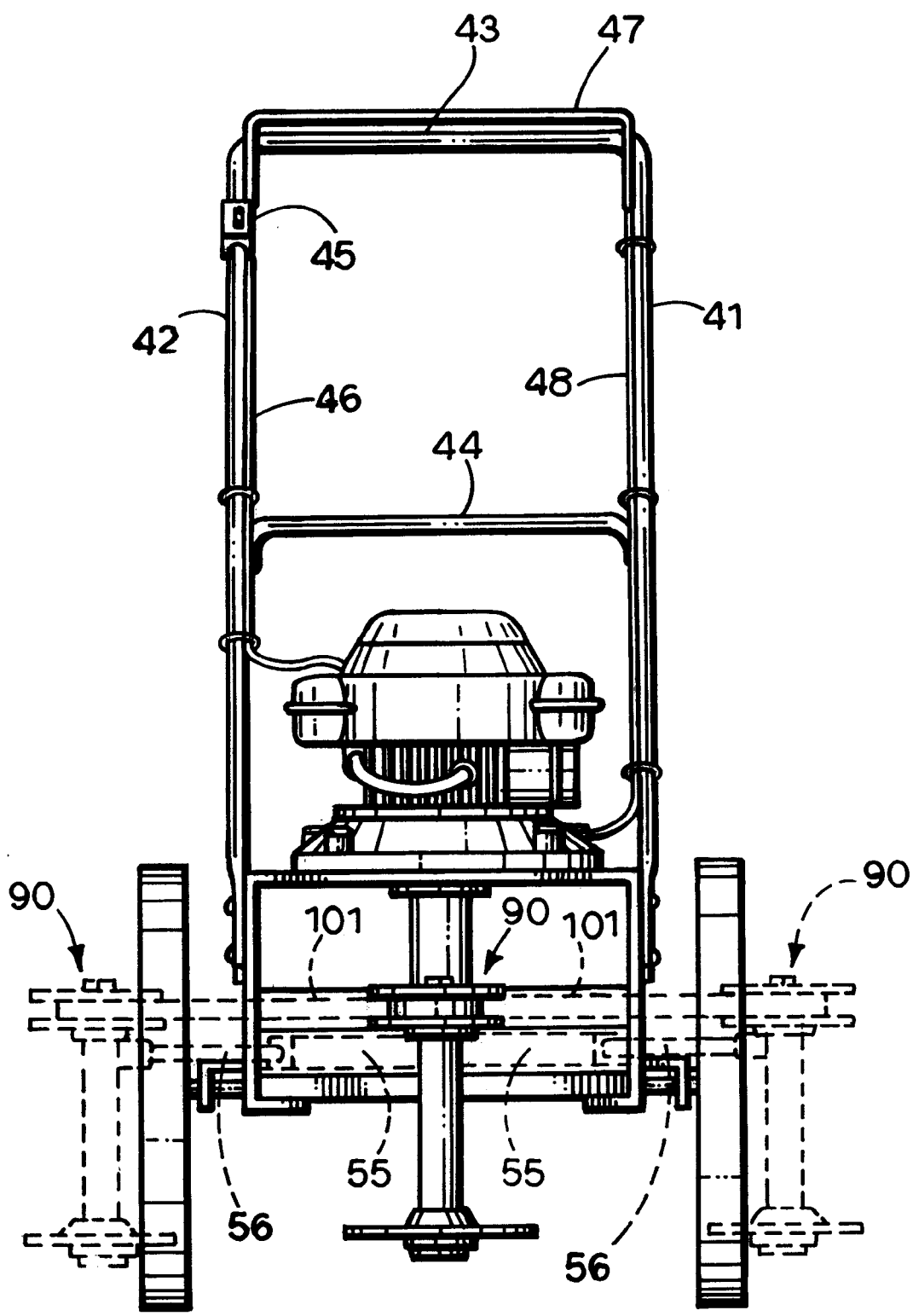
FIG. 4 is a fragmentary front perspective view of the apparatus of FIG. 1, showing the weed trimmer head positioned in the center in solid lines and swivelled to the right and to the left in dashed lines.

As indicated, the string trimmer attachment 103 (or other attachment) can also be moved generally laterally in an arc about the vertical axis extending through the pivot pin 58, and secured, by latch 11, in a central position, a rightward position or a leftward position as generally shown in FIG. 4. As noted above, the implement mounting assembly 3 is releasably maintained in the central, rightward or leftward positions by advancement of the flange 60 into associated notches 13 on latch 11.

It is to be understood that while certain forms of the present invention have been illustrated and described herein, it is not to be limited to the specific forms or arrangement of parts described and shown.

What is claimed and desired to be secured by Letters Patent is as follows:

1. A mobile apparatus that is capable of moving over a ground surface, said apparatus comprising:
   a) a support frame;
   b) an engine mounted to said support frame and having an engine drive shaft extending therefrom;
   c) a telescoping implement mounting assembly having a base member mounted to said frame and a telescoping member slidably and rotatably mounted to said base member such that said telescoping member telescopes relative to said base member and is rotatable relative to said base member about a horizontal axis;
   d) an implement drive shaft rotatably mounted to said telescoping member at a distal end thereof;
   e) a drive assembly connected between said engine drive shaft and said implement drive shaft and rotatably driving said implement drive shaft; and
   f) a rotatable implement securable to said implement drive shaft.

2. The apparatus as in claim 1 wherein:
   a) said rotatable implement comprises one of a plurality of rotatable implements removably securable to said implement drive shaft.

3. The apparatus as in claim 2 wherein:
   a) said plurality of rotatable implements include a string trimmer head.

4. The apparatus as in claim 1 further comprising:
   a) a clamp assembly on said base member of said telescoping implement mounting assembly selectively engaging said telescoping member to prevent movement of said telescoping member relative to said base member.

5. The apparatus as in claim 1 further comprising:
   a) a latch mounted to said frame and selectively advanceable into engagement with said base member to fix the pivotal relationship of said base member relative to said frame.

6. The apparatus as in claim 1 wherein said telescoping member is rotatable relative to said base member such that said implement drive shaft is pivotable between vertical and horizontal positions.

7. An apparatus capable of moving over a ground surface, said apparatus comprising:
   a) a support frame having wheels rotatably mounted thereto;
   b) an engine mounted to said support frame and having an engine drive shaft extending therebelow with a drive pulley mounted to said drive shaft for rotation about a first vertical axis;
   c) a pivot arm pivotally mounted to said support frame below said drive pulley and pivotal about a second vertical axis;
   d) a mounting shaft rotatably and slidably mounted to said pivot arm such that said mounting shaft is rotatable about a horizontal axis extending through said pivot arm and slidable relative to said pivot arm, said pivotal mounting of said pivot arm allowing a front end of said mounting shaft to move laterally relative to said support frame;
   e) a bearing sleeve mounted to said front end of said mounting shaft;
   f) an implement drive shaft rotatably mounted in said bearing sleeve;
   g) an implement drive pulley connected to said implement drive shaft at a first end thereof and an implement connected to said implement drive shaft at a second end thereof on an opposite side of said bearing sleeve as said implement drive pulley;
   h) a drive belt connecting said drive pulley to said second pulley; and
   i) a spring connected to said pivot arm and said mounting shaft and biasingly urging said front end of said mounting shaft away from said pivot arm.

8. The apparatus as in claim 7 further comprising:
   a) a clamp assembly on said pivot arm selectively engaging said mounting shaft to prevent movement of said mounting shaft relative to said pivot arm.

9. The apparatus as in claim 7 further comprising:
   a) a latch mounted to said frame and selectively advanceable into engagement with said pivot arm to fix the pivotal relationship of said pivot arm relative to said frame.

10. The apparatus as in claim 7 wherein:
    a) said implement comprises one of a plurality of implements removably securable to said implement drive shaft.

11. The apparatus as in claim 10 wherein:
    a) said plurality of implements include a string trimmer head.

12. The lawn maintenance apparatus as in claim 9 wherein said pivot arm can be fixed to said support frame by said latch in a plurality of pivot arm positions, said mounting shaft front end being in a different lateral orientation relative to said support frame in each of said pivot arm positions.

13. The lawn maintenance apparatus as in claim 12 wherein said plurality of pivot arm positions include:
    a) a leftward position wherein said mounting shaft front end extends to the left of said support frame;
    b) a central position wherein said mounting shaft front end is centered relative to said support frame; and
    c) a rightward position wherein said mounting shaft front end extends to the right of said support frame.

14. A lawn maintenance apparatus comprising:
a) a support frame;
b) at least two wheels rotatably mounted on and rollably supporting said support frame such that said lawn maintenance apparatus is moveable over a ground surface in a direction of travel, the direction of travel defining a front end of said support frame;
c) an engine mounted to said support frame and having an engine drive shaft extending therefrom;
d) a telescoping implement mounting assembly having a base member pivotally mounted to said support frame and a telescoping member slidably mounted to said base member such that said telescoping member telescopes relative to said base member, said telescoping member having a distal end extending outwardly from said support frame front end;
e) an implement drive shaft rotatably mounted to said telescoping member proximate said distal end thereof;
f) a drive assembly connected between said engine drive shaft and said implement drive shaft and rotatably driving said implement drive shaft; and
g) a rotatable implement securable to said implement drive shaft; wherein
h) said pivotal mounting of said base member to said support frame allows said telescoping member distal end to be selectively laterally moveable relative to said support frame front end.

15. The lawn maintenance apparatus as in claim 14 and further comprising a latch mounted to said support frame and selectively advanceable into engagement with said base member to fix the pivotal relationship of said base member relative to said support frame.

16. The lawn maintenance apparatus as in claim 15 wherein said base member can be fixed to said support frame by said latch in a plurality of base member positions, said telescoping member distal end being in a different lateral orientation relative to said support frame front end in each of said base member positions.

17. The lawn maintenance apparatus as in claim 16 wherein said plurality of base member positions include:
   a) a leftward position wherein said telescoping member distal end extends to the left of said support frame front end;
   b) a central position wherein said telescoping member distal end is centered relative to said support frame front end; and
   c) a rightward position wherein said telescoping member distal end extends to the right of said support frame front end.

18. The lawn maintenance apparatus as in claim 14 wherein said telescoping member is rotatable relative to said base member such that said implement drive shaft is pivotable between vertical and horizontal positions.

19. The apparatus as in claim 18 further comprising a clamp assembly on said base member selectively engaging said telescoping member to prevent movement of said telescoping member relative to said base member.

* * * * *